United States Patent [19]

Zink et al.

[11] 4,257,762
[45] Mar. 24, 1981

[54] MULTI-FUEL GAS BURNER USING PREHEATED FORCED DRAFT AIR

[75] Inventors: John S. Zink; Robert D. Reed, both of Tulsa, Okla.; Horst M. Glomm; Klaus E. Sawatski, both of Frankfurt, Fed. Rep. of Germany

[73] Assignee: John Zink Company, Tulsa, Okla.

[21] Appl. No.: 939,475

[22] Filed: Sep. 5, 1978

[51] Int. Cl.³ .............................................. F23C 5/08
[52] U.S. Cl. ..................... 431/177; 431/187; 431/217; 431/284; 431/348; 239/424.5
[58] Field of Search ............... 431/162, 171, 175, 177, 431/181, 187, 217, 284, 347, 348; 239/424.5, 425

[56] References Cited

U.S. PATENT DOCUMENTS

| | | | |
|---|---|---|---|
| 370,251 | 9/1887 | Field | 431/162 |
| 1,779,647 | 10/1930 | Van Brunt | 431/162 |
| 3,123,127 | 3/1964 | Willott | 431/177 |
| 3,139,138 | 6/1964 | Bloom | 431/177 |
| 3,182,712 | 5/1965 | Zink et al. | 431/187 |
| 3,663,153 | 5/1972 | Bagge et al. | 431/187 |
| 4,045,160 | 8/1977 | Michels | 431/347 |

Primary Examiner—Samuel Scott
Assistant Examiner—Lee E. Barrett

Attorney, Agent, or Firm—Head & Johnson

[57] ABSTRACT

A multi-fuel gas burner using preheated forced draft air, comprising a cylindrical inner burner tube, supported by the wall of a furnace, and inserted into an opening in said wall, and including means to inject through the upstream end combustion air preheated to a selected temperature, and compressed to a selected pressure. The downstream end of the inner burner tube closed, and a plurality of longitudinal slots, circumferentially spaced, in the wall of the tube at the closed end. Means to inject rich fuel gas up to 3,500 btu/cu feet under selected pressure into the inner burner tube along its axis. An outer burner tube axially surrounding said inner burner tube and forming an annular passage therebetween. Means to pass low pressure, lean, combustible gas of as low as 50 btu/cu feet down said annular passage and outwardly through a circumferential slot at the end of said outer burner tube inside the furnace. The hot combustion air and rich gas flowing through the inner burner tube and radially outwardly and rearwardly through the plurality of slots, flow against and mix with the lean gas flowing outwardly through the circumferential slot, and burn against the surface of a tile, having a central opening, through which the burner is inserted into the furnace.

12 Claims, 11 Drawing Figures

MULTI-FUEL GAS BURNER USING PREHEATED FORCED DRAFT AIR

BACKGROUND OF THE INVENTION

1. Field of the Invention

This invention lies in the field of gas burners for burning waste, low-pressure, lean gas that has some combustible material. More particularly, it concerns the design of a burner which can utilize low calorific value gas alone, or in combination with rich gas, in a furnace, for the production of rich radiance from the burner to assist in ultimate heat transfer.

2. Description of the Prior Art

Demand for fuel conservation is an important consideration today, and makes the use of combustion air preheat by waste heat usage, for increased heat energy conservation, a greatly preferred practice through significantly increased efficiency of use of fuel-provided sensible heat.

In the prior art, premix operation of fuel and air makes it decidedly a cumbersome and essentially impossible operation to substitute hot (preheated) air for the normally used cold air, for a number of reasons, which are well-known to those versed in the art of such gaseous fuel burning.

The prior art systems are typically used in chemical operations for processing raw materials, and it is typical for those process operations to produce waste gases which have useful calorific value, but which cannot be used in gas burners designed for limited fuel characteristics. As an example, the waste gas having calorific value of, say, 200 btu/cf LHV cannot be burned effectively in burners which have been designed for 910 btu/cf LHV methane or natural gas.

There is a great effort to make use of the waste gases, which are in ample supply, as process fuel, but this is not possible with conventional burners, for various reasons aside from lower calorific value. Because of this ordinarily there cannot be full usage of all available fuel, which results in energy waste. Waste gases having calorific value as low as 50 btu/cf are capable of heat energy production in a useful manner, if it is possible to burn them as fuel.

Such waste gases are generally produced only after particular processes become operational, and it is necessary to use a standard fuel, such as natural gas, for example, for heat production required to cause the process to become operational, or for start-up. It, therefore, is necessary for gas burners to be suitable for operation with either, or both, natural gas or the waste gas in typically-used premix gas burners. Since combustion air is supplied for the burner at pressure greater than atmospheric pressure, and gas energy is not required for inspiration of air for combustion, this becomes possible. The prior art burners make use of gas fuel energy as it is discharged from high (15 lb.) supply pressure into the atmosphere, in order to supply air for combustion, in typical self-inspirating atmospheric air pressure burners.

If the waste gases have calorific value because of the presence within them of combustible matter, other than free hydrogen, it is advantageous to premix a selected quantity of air with the fuel before the fuel-air mixture is discharged for burning. If free hydrogen is a predominant fuel combustible, such premix operation is undesirable and dangerous because of possible flashback of flame into the burner structure, which could severely damage the burner.

SUMMARY OF THE INVENTION

It is the primary object of this invention to provide a burner assembly which is capable of burning lean water gas, at low pressure, having low calorific heat value, as low as low as 50 btu/ cubic foot, by providing preheated compressed air for combustion, and providing, in addition, rich fuel gas, as high as 3,500 btu/cu foot, as necessary, to supplement the heat derived from burning the lean waste gases, or capable of full required heat production with either fuel alone.

These and other objects are realized and the limitations of the prior art are overcome in this invention by providing a burner which is adapted to be inserted through an opening in a tile wall of a furnace. The burner comprises an inner burner tube to which preheated compressed combustion air is supplied at the outer end. Means to control the flow of the compressed heated air is provided. The air flows inwardly to the distal end of the inner burner tube, which is provided with a burner tip, which is flared outwardly in a progressively increasing manner, and closed at its outer end. A plurality of circumferentially spaced longitudinal slots are provided in the outer wall of the tip at the closed end, so that the compressed heated air will flow radially outwardly through the plurality of slots in a direction toward the inner wall of the tile.

Rich gaseous fuel is supplied through a pipe inserted radially into the wall of the inner burner tube. This gas pipe has one or a plurality of orifices which are positioned approximately at the axis of the burner tube and are directed downstreamwise.

An outer burner tube of slightly larger diameter is mounted coaxially to the inner burner tube, providing an annular passage therebetween. A low heat content waste gas is supplied to the outer end of the annular passage and this gas flows downstreamwise through the annular passage and circumferentially outwardly at the distal end. The innerface of the tile is provided with either a curved flaring surface contour or by a counterbore or square cornered enlargement of selected depth from the inner end and selected radius.

The outflowing lean gas which flows through the circumferential slot flows against the wall of the tile and the hot compressed air flows against the same tile, mixing with the lean gas, and burning against the wall of the tile, which assumes a highly radiant condition, supporting stable combustion.

An annular flange or baffle is fastened to the outer surface of the inner burner tube, the radial width of which is less than the radial width of the annular passage, so tht the lean gas will, in flowing over this obstacle, distribute itself uniformly, circumferentially, in the annular passage.

If the composition of the lean gas is such that premixing air with the lean gas is desirable, a plurality of openings through the wall of the inner burner tube are provided, through which air can flow, to mix with the lean gas prior to issuing from the circumferential slot. If hydrogen is present to a substantial degree in the composition of the lean waste gas, the premixing of air is not desirable and the openings are not provided. If the premixing is desired, as much as 30% of the combustion air may be diverted from the inner burner tube, through these openings, to be premixed with the lean gas prior to issuance from the outlet slot.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
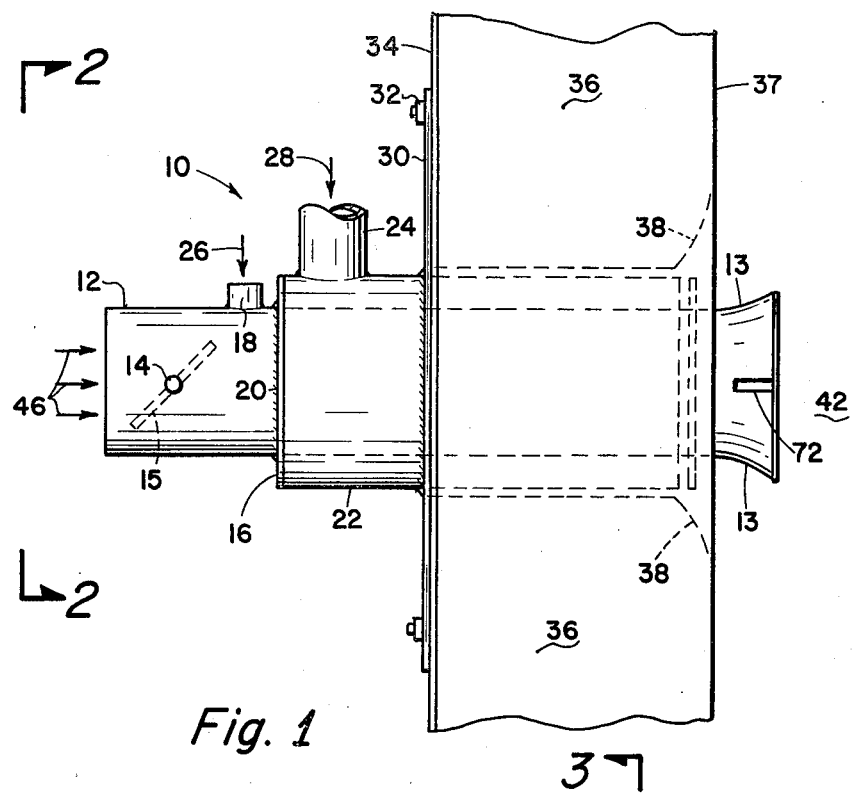
FIG. 1 represents a side view of the one embodiment of this invention, positioned in the wall of a furnace.
Figure 2:
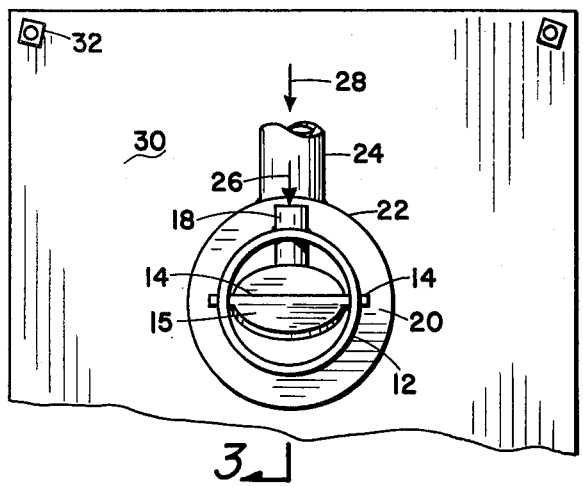
FIG. 2 illustrates an end-on view of the burner of FIG. 1, taken across the plane 2—2 of FIG. 1.

Referring now to the drawings, and, in particular, to FIG. 1 and FIG. 2, there are shown two views of a preferred embodiment of this invention, indicated by the numeral 10. The burner comprises a cylindrical inner tube 12 surrounded by an outer burner tube 22 which is closed at its upstream end, and provides an annular passage between the two burner tubes. Means, such as pipe 24, are provided for the flow of lean combustible gas, in accordance with arrow 28, down the pipe 24 and along the annular space between the two burner tubes. The two burner tubes are supported by a plate 30, which is fastened by bolts 32 to the outer steel wall 34 of the furnace. A tile 36 is provided with a central opening into which the burner is inserted.

Figure 11:
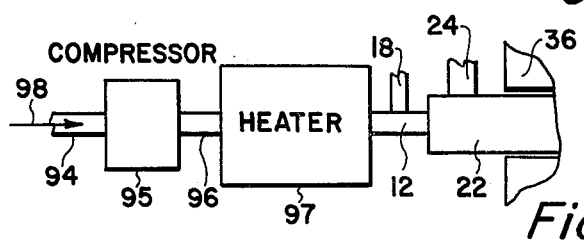
FIG. 11 illustrates the use of the burner with a compressor and preheater for the combustion air.

Referring briefly to FIG. 11, there is shown an inlet pipe 94, through which combustion air is drawn in accordance with arrow 98. This air flows through the inlet pipe 94 to a compressor 95, which raises the pressure to a selected value, greater than atmospheric, so that air aspiration is not required. The compressed air heated by the compression, is passed through an outlet pipe 96 into a preheater 97, which may be a conventional type of waste-heat transfer device. In the heater 97 the air is heated to a temperature of at least 400°. It then flows into the inner burner tube 12 and into the furnace as will be further described.

Means are provided, such as the damper or other means for controlling the rate of flow of compressed heated air.

Figure 3:
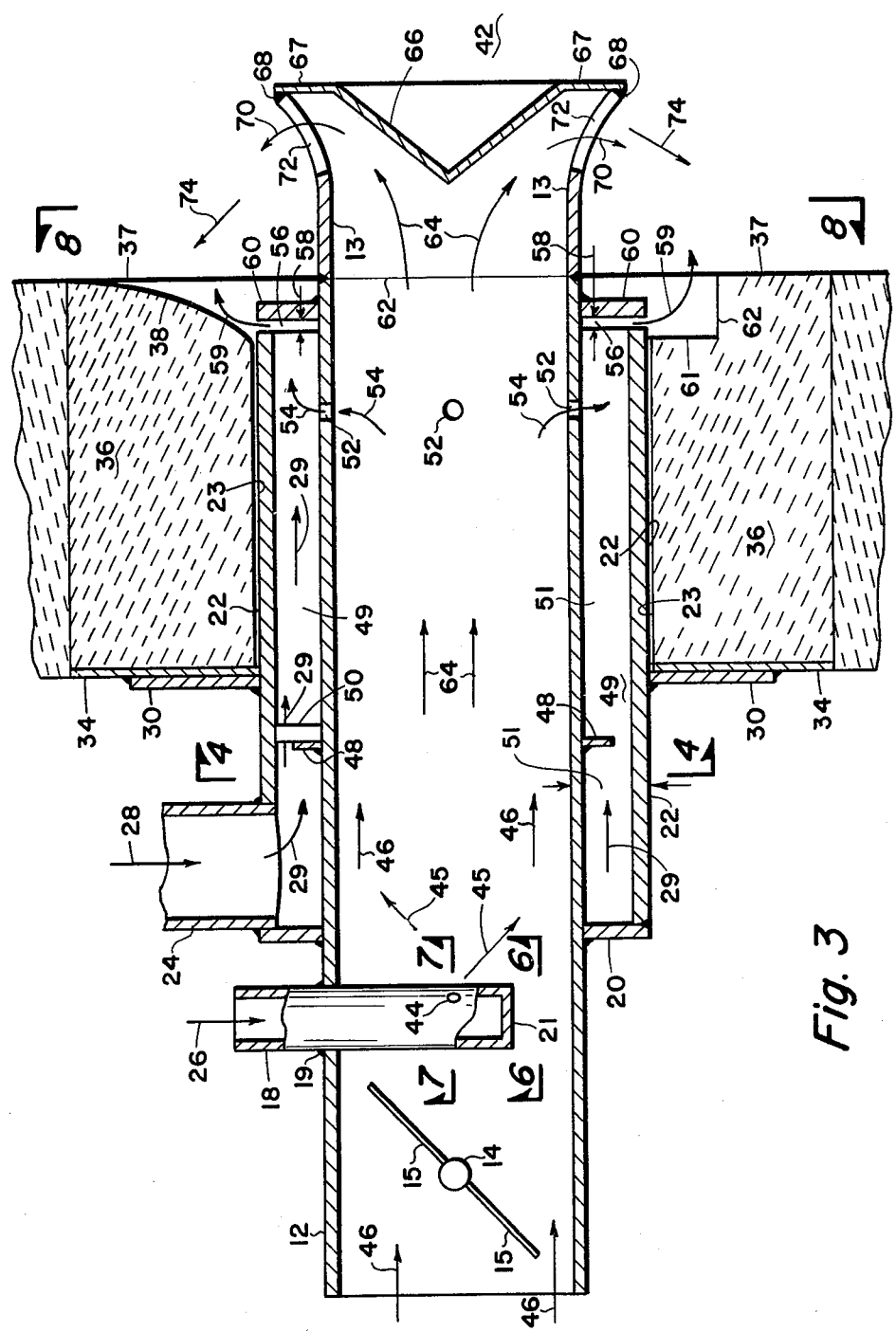
FIG. 3 illustrates in cross-section the details of the burner of FIG. 1, taken across the plane 3—3 of FIG. 2.

Referring now to FIG. 3, there is shown in side elevation cross-section the preferred embodiment of this invention. The inner burner tube 12 comprises a section of steel pipe into which heated compressed air for combustion flows in accordance with the arrows 46. Damper means, such as 15, mounted on a transverse shaft 14 serves to control the rate of air flow in accordance with the gas flow and the heat requirements, etc., as is well-known in the art. A small diameter pipe 18 is inserted through an opening and welded 19 in the wall of the inner burner tube 12 at a point downstream from the damper 15. Rich fuel gas is supplied in accordance with arrow 26 into the tube 18. The end of the pipe 18 inside of the burner tube 12 is closed, and one or a plurality of orifices 44 are provided on the downstream side of the pipe 18 at the position of the axis of the pipe 12.

Figure 5:
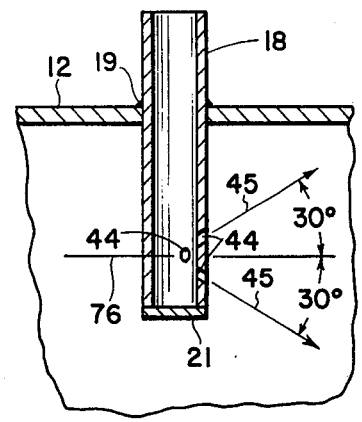

Referring now to FIG. 5, there is shown a detail of the pipe 18, which is inserted as by welding 19, through the wall of the inner burner tube 12. The pipe should extend preferably three quarters of the inner diameter of pipe 12. At the axis 76 of the burner tube a single orifice which would be directed along the axis 76 can be provided. Preferably, a plurality of orifices 44 can be provided, drilled in such a manner that their axes lie along a conical surface. The gas flow from the orifices 44 will flow in accordance with arrows 45, which should be at some selected angle, such as 30° to the axis 76.

Figure 7:
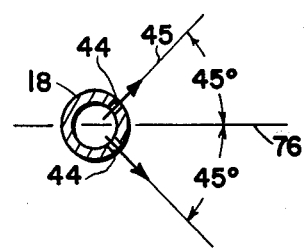

Referring now to FIG. 7, there are shown two additional orifices which may be drilled at the same angle, such as 30°, or at an increased angle, such as 45°, for example, to the axis 76. The purpose of the angular flow of the rich gas is to be thoroughly entrained in the high velocity flow of combustion air 46 down past the pipe 18 to mix with the gas. The mixture of air and gas now indicated by arrows 64 (FIG. 3) flows downstreamwise through the inner burner tube and outwardly radially through the slots 72 in the circumferential wall of the burner tip 13. The outwardly flow of air and gas is shown by the arrows 70 and 74, being directed against and along the surface 38 of the inner wall of the tile 37. The surface 38 is a reentrant portion of the inner wall 37, and may be conically flaring, or cylindrical, or both, in the form of a plurality of alternating circumferential segments.

Reference, heretofore, to 18, 21 and 26, and the ports 44 presumes the burning of a rich fuel, either alone or as supplement for lean fuel, if required, but, if heat production from lean fuel gas/gases is adequate for heat demand, there is no burning of rich fuel needed. In such cases, air 46 alone proceeds as arrow-indicated, and 64, at approach to 72 contains no fuel, and is, instead, air for discharge across 72 from pressure which causes air discharge from 72 (as 70) at a velocity of at least 125 feet per second in the direction 74. Air 70-74 supplies oxygen for the combustion of 59, and, because of its flow velocity, it also supplies ample turbulence for mixture of 59 with air as supplied by 70; also in contact with the reentrant surfaces of the tile adjacent to 13 to highly heat this tile surface 38 and cause it to become richly radiant. Radiance of the tile 37 in areas 38 adjacent to 13, which facilitates heat transfer, occurs at all times the burner is in operation, and with lean fuel alone; a mixture of lean and rich fuels, or with rich fuel alone, is as is well-known in the heat transfer arts, quite advantageous and desirable.

The end closure 67 of the tip 13 of the inner burner tube 12 can be a plane disc. However, it is preferably in the form of a coaxial conical surface pointed upstream, so tht the downflowing air and gas 64 will be diverted 64, radially outwardly and through the slots 72, in accordance with arrows 70 and 74.

At a point upstream of the tip 13, a plurality of openings 52 may be drilled through the wall of the inner burner tube 12 so that the pressurized air, or the pressurized mixture of air and rich gas 54, can flow through these openings into the annular space 49 between the inner burner tube 12 and an outer burner tube 22, which surrounds the inner burner tube.

The outer burner tube 22 is positioned concentric with the inner burner tube and provides an annular passage of selected radial width 51. Means such as tripod legs 50 can be provided to insure the coaxial position of the two pipes. Also, a narrow annular flange or baffle 48 is provided and attached to the outer surface of the inner burner tube 12. This has a radial dimension which is a selected fraction of the total radial spacing 51 of the annular passage. The purpose of this flange or baffle is to provide for uniform spreading of the lean gas flow around the entire circumference of the annular passage below the position of the baffle 48.

The outer burner tube 22 is partially closed by means of an annular ring 60 attached to the outer wall of the inner burner tube, but spaced 58 away, leaving a narrow circumferential gap 56 through which the lean gas can flow in accordance with arrows 59 into, and along the wall 38 of the tile 36. The wall 38 forms a reentrant conical or cylindrical portion at the central opening 22. The lean gas mixture enters the annular passage by means of the pipe 24 in accordance with arrow 28, and it flows in accordance with arrows 29 downstream through the annular passage where it flows out of the circumferential gap 56 in accordance with arrow 59.

Figure 4:
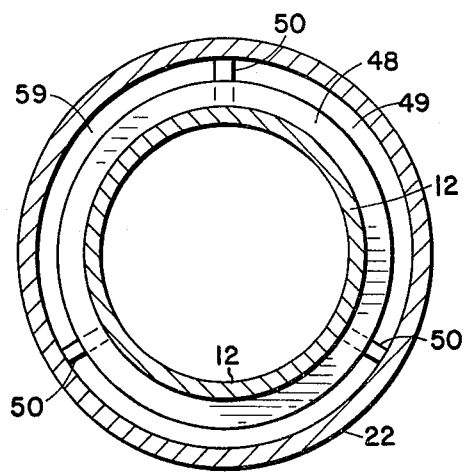
FIGS. 4, 5, 6, 7, 8, 9, and 10 indicate additional details of the construction of the burner of FIG. 3.

FIG. 4 is a cross-section taken across the plane 4—4 of FIG. 3, and indicates the inner burner tube 12, the outer burner tube 22, the annular passage 59 between the two, the tripod legs 50, and the annular flange or baffle 48.

The objective of the nozzle design of this burner is that the lean gas will issue at a rather high velocity from the slot 56, of approximately 50 feet per second, or more, and will flow along the curved surface 38 of the tile. The hot pressurized air will flow in accordance with arrows 70 and 74 through each of the plurality of slots 72 and into the flow of lean gas, so that there will be rapid mixing and burning along the surface 38. The tile should become highly radiant to facilitate maintaining the combustion of the lean gas and air.

In the lower portion of FIG. 3, the shape of the inner surface 37 of the tile 36 is shown as a counterbore, or a square cut into the surface of the tile, having a new wall surface 61, and an outer circumferential surface 62. In this design there will be more opportunity for a quiet combustion area where the flame can be maintained more stably. However, both forms of surfaces 38, in the one case, and 61 and 62 in the other, can be used interchangeably or in combination.

Figure 8:
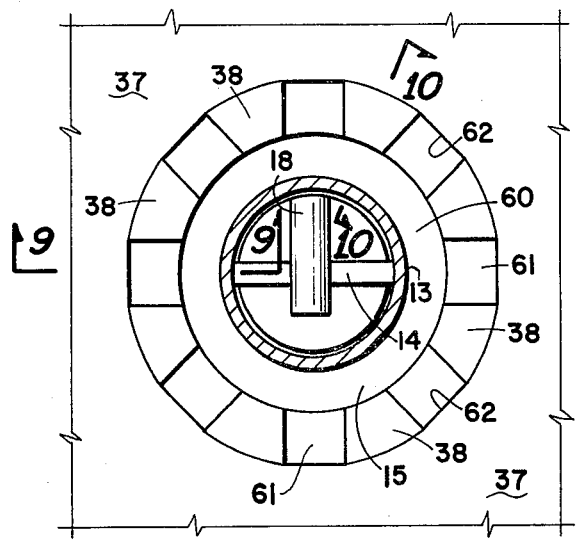
Figure 6:
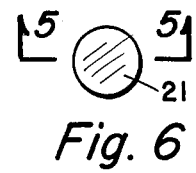
Figure 9:
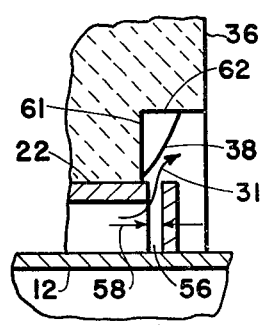
Figure 10:
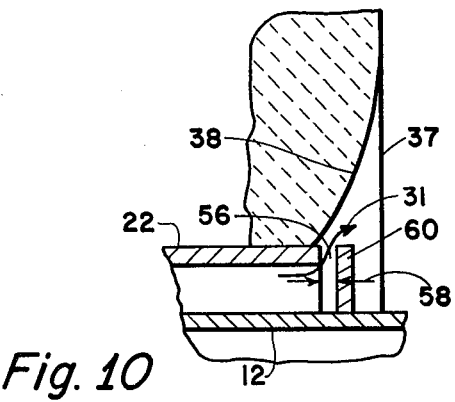

Referring now to FIG. 8, there is shown a view taken along the plane 8—8 of FIG. 3, which shows the sectioned end of the inner burner tip 13 and the annular flange 60. However, the surface 37 of the tile is circumferentially broken up into alternate segments of the rectangular cut 61, 62 and the smoothly flaring surface 38, where a combination of the two types of surfaces is possible. These portions of the tile are detailed in FIGS. 9 and 10, which are sections taken along the plane 9—9 and 10—10, respectively, of FIG. 8.

With 8, more or less, separate pairs of segments 38 and 61, 62, there could be any required multiple of 8-16 slots 72 in the burner tip for required gaseous flow area, for example, with each flow of combustion air 70, 74 flowing into one of the segments.

A typical burner of this design might be one in which the inner burner tube has an inner diameter of approximately four inches and a quarter-inch wall thickness. The inner diameter of the outer burner tube might be six inches, providing five-eighths inch radial width baffle in a three-quarter inch wide annular passage.

What has been described is an improved type of burner for combustion of low heat value waste gases, available at rather low pressures of the order of 2" WC. In order to maintain a required heat output, and in order to efficiently completely burn the waste gas, it may be desirable to provide a source of rich gas at a pressure of approximately 15 psi gauge to mix with the heated (400° F.) air at a pressure sufficient to provide velocity at exit from the slots 72 of approximately 150 ft. per second. The use of the rich gas provides a continuing flame to insure the complete combustion of the low heat value waste gas. The rich gas also makes it possible to vary the heat output from fuels to the burner as required by the furnace utilization of heat.

While the invention has been described with a certain degree of particularity, it is manifest that many changes may be made in the details of the construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

What is claimed:

1. A multi-fuel gas burner using preheated, forced-draft air, comprising:
    (a) a cylindrical inner burner tube, supported by a wall of a furnace, and inserted into an opening in said wall having tile, capable of becoming radiant, surrounding the opening on the inside surface of said wall; means to inject, through the upstream end of said inner burner tube, combustion air heated to a selected temperature and compressed to a selected pressure;
    (b) the downstream end of said burner tube closed and a plurality of longitudinal slots, circumferentially spaced in the wall of said tube at said closed end and oriented so as to direct gases issuing therefrom toward said tile;
    (c) an outer burner tube axially surrounding said inner burner tube, forming an annular passage therebetween;
    (d) means to selectively introduce low pressure lean combustible gas into said annular passage toward the distal end thereof;
    (e) means to direct said lean gas from said annular space to meet and turbulently mix with said combustion air in the vicinity of said tile to assist, after ignition, the complete combustion of said lean gas adjacent said tile, and thus radiantly heat said wall to a temperature sufficient to maintain ignition of said lean gas-air mixture; and
    (f) means to selectively inject rich fuel gas downstreamwise, under a selected pressure and selected ratio of said lean combustible gas to said rich fuel gas, into said inner burner tube at a point downstream of said upstream end.

2. The burner as in claim 1 including an annular circumferential baffle attached to the outer surface of said inner burner tube of radial width a selected fraction of the radial width of said annular passage.

3. The burner as in claim 1 including means to control the flow rate of said combustion air.

4. The burner as in claim 1 wherein said means to direct said lean gas includes an annular ring attached to the outer wall of said inner burner tube at the downstream end of said annular passage to divert the flow of lean combustible gas outwardly toward said tile.

5. The burner as in claim 1, including at least one opening through said wall of said inner burner tube into said annular passage.

6. The burner as in claim 1 in which said means to inject rich fuel gas comprises;

(a) a pipe inserted radially through the wall of said inner burner tube, said pipe closed at its inner end; and (b) at least one orifice in the wall of said pipe directed downstream along the axis of said inner burner tube.

7. The burner as in claim 6 including a plurality of orifices directed in a conical pattern downstreamwise along the axis of said inner burner tube.

8. A multi-fuel gas burner using preheated, forced-draft air, comprising;

(a) a cylindrical inner burner tube, supported by the wall of a furnace, and inserted into an opening in said wall; means to inject through the upstream end of said inner burner tube, combustion air heated to a selected temperature and compressed to a selected pressure;

(b) the downstream end of said burner tube closed and a plurality of longitudinal slots, circumferentially spaced in the wall of said tube at said closed end;

(c) an outer burner tube axially surrounding said inner burner tube, forming an annular passage therebetween; and means to pass low pressure lean combustible gas down said annular passage toward the distal end thereof; means forming a circumferential slot at said distal end for the outwardly flow of said lean gas;

whereby the heated and pressurized combustion air flowing from said plurality of longitudinal slots, will meet and turbulently mix with said lean fuel gas to assist the complete combustion of said lean gas adjacent said circumferential slot; and including (d) means to inject rich fuel gas downstreamwise, under selected pressure, into said inner burner tube along the axis thereof, at a point downstream of said upstream end;

whereby said burner can be used to burn low pressure lean fuel gas and high pressure rich fuel gas in varying ratios.

9. The burner as in claim 8 in which said means to inject rich fuel gas comprises;

(a) a pipe inserted radially through the wall of said inner burner tube, said pipe closed at its inner end; and (b) at least one orifice in the wall of said pipe directed downstream along the axis of said inner burner tube.

10. The burner as in claim 9 including a plurality of orifices directed in a conical pattern downstreamwise along the axis of said inner burner tube.

11. A multi-fuel gas burner using preheated, forced-draft air, comprising;

(a) a cylindrical inner burner tube, supported by the wall of a furnace, and inserted into an opening in said wall; means to inject through the upstream end of said inner burner tube, combustion air heated to a selected temperature and compressed to a selected pressure;

(b) the downstream end of said burner tube closed and a plurality of longitudinal slots, circumferentially spaced in the wall of said tube at said closed end;

(c) an outer burner tube axially surrounding said inner burner tube, forming an annular passage therebetween; and means to pass low pressure lean combustible gas down said annular passage toward the distal end thereof; means forming a circumferential slot at said distal end for the outwardly flow of said lean gas;

whereby the heated and pressurized combustion air flowing from said plurality of longitudinal slots, will meet and turbulently mix with said lean fuel gas to assist the complete combustion of said lean gas adjacent said circumferential slot; and including (d) at least one opening through the wall of said inner burner tube into said annular passage;

whereby a selected quantity of pressurized air will flow through said at least one opening, and mix with said lean gas prior to passage through said circumferential slot.

12. The burner as in claim 11 including a plurality of openings through the wall of said inner burner tube, said openings positioned in a transverse plane and circumferentially spaced.

* * * * *